United States Patent
Palonen et al.

(10) Patent No.: US 7,794,604 B2
(45) Date of Patent: Sep. 14, 2010

(54) METHOD FOR REMOVING LIGNIN FROM WATER

(75) Inventors: Heikki Palonen, Vaasa (FI); Arja Paloniemi, Vähäkyrö (FI); Reetta Taittonen, Laihia (FI); Päivi Rousu, Kotka (FI)

(73) Assignee: Kemira Oyj (FI)

( * ) Notice: Subject to any disclaimer, the term of this patent is extended or adjusted under 35 U.S.C. 154(b) by 554 days.

(21) Appl. No.: 11/571,846

(22) PCT Filed: Jul. 8, 2005

(86) PCT No.: PCT/FI2005/000324

§ 371 (c)(1),
(2), (4) Date: Aug. 15, 2007

(87) PCT Pub. No.: WO2006/005797

PCT Pub. Date: Jan. 19, 2006

(65) Prior Publication Data

US 2008/0149568 A1    Jun. 26, 2008

(30) Foreign Application Priority Data

Jul. 9, 2004    (FI) ................................. 20040967

(51) Int. Cl.
*C02F 1/52* (2006.01)
*C02F 103/28* (2006.01)

(52) U.S. Cl. .................. 210/724; 162/29; 162/189; 210/726; 210/928

(58) Field of Classification Search .................. 210/928
See application file for complete search history.

(56) References Cited

U.S. PATENT DOCUMENTS

| | | | | |
|---|---|---|---|---|
| 2,218,053 A * | 10/1940 | Schwabe et al. | ............ | 210/702 |
| 2,949,448 A * | 8/1960 | Toppel | ................ | 530/500 |
| 3,269,941 A | 8/1966 | Le Compte et al. | | |
| 3,627,679 A * | 12/1971 | Fuller | .................. | 210/711 |
| 3,639,206 A * | 2/1972 | Spruill | ................ | 162/29 |
| 4,051,028 A * | 9/1977 | Fiessinger | ............ | 210/716 |
| 4,420,369 A | 12/1983 | Eaton et al. | | |
| 4,589,427 A * | 5/1986 | Barnes | .................. | 131/181 |
| 4,812,207 A * | 3/1989 | Gullichsen et al. | ............. | 162/29 |
| 5,013,454 A * | 5/1991 | Hynninen | ............ | 210/718 |
| 6,589,427 B2 * | 7/2003 | Moghe et al. | ............... | 210/667 |
| 7,422,692 B1 * | 9/2008 | Sanders | ................ | 210/709 |

FOREIGN PATENT DOCUMENTS

| WO | 8603236 A1 | 6/1986 |
|---|---|---|
| WO | 9421857 A1 | 9/1994 |
| WO | 9945192 A1 | 9/1999 |
| WO | 9953133 A1 | 10/1999 |

OTHER PUBLICATIONS

International Search Report; International Application No. PCT/FI2005/000324; Date of Mailing: Nov. 17, 2005.
Bakhshi Narendra N., et al. "Colour Removal From Pulp Mill Effluents Using Fly Ash-Mini Pilot Plant Experience" Aiche Symposium Series, American Institute of Chemical Engineers, New York, NY vol. 76 (1980), pp. 104-113.

* cited by examiner

*Primary Examiner*—Peter A Hruskoci
(74) *Attorney, Agent, or Firm*—Cantor Colburn LLP

(57) ABSTRACT

The invention relates to a method for removing lignin from an aqueous solution. It is accomplished by adding a calcium compound and an aluminium compound to said solution. Said calcium compound is preferably calcium chloride and said aluminium compound is preferably a polymeric aluminium hydroxide salt.

10 Claims, No Drawings

METHOD FOR REMOVING LIGNIN FROM WATER

The invention relates to a method for removing lignin from an aqueous solution by adding a calcium compound and an aluminium compound thereto.

The bleaching sequence of chemical pulp often comprises one or several peroxide steps. The bleaching conditions with respect to pH are alkaline, also being relatively hot (>60° C.). Under these conditions, the lignin contained in the pulp is partly dissolved and partly becomes less coloured on the fiber surface. After bleaching, the pulp is washed and the drained water is normally passed to a water treatment unit. Lignin dissolving in water results in a yellowish brown colour thereof. Lignin is considered as a sparingly biodegradable substance, thus having a great influence on the properties of purified waste water. Therefore it would be desirable to be able to remove lignin from the waste water prior to biological treatment thereof.

It is known that calcium precipitates lignin. Several references, even recent ones, to this issue may be found in the literature. However, the precipitating power thereof is rather limited. See Table 2 below.

U.S. Pat. No. 4,420,369 discloses the addition of an acid liquid containing calcium and aluminium to an aqueous solution containing lignin, thus resulting in neutralization of the liquid mixture for lignin precipitation. The result of this precipitation is, however, unsatisfactory.

Accordingly, the object of the invention is to provide a more effective method for removing lignin from an aqueous solution such as waste water from bleaching of chemical pulp. The object has now been achieved by adding a calcium compound and an aluminium compound to said aqueous solution for lignin removal. It was found that the precipitation result could be improved by avoiding the acidic step of said US-publication.

As is mentioned, the invention closely relates to lignin removal from bleaching water of chemical pulp. Normally, this bleaching water is basic having a pH of about 10. In this case, it is preferable for the invention to adjust the pH value of the aqueous solution between 5 and 6. This may for instance be carried out by adding an inorganic acid e.g. sulphuric acid. In case the aluminium compound used causes an acidic reaction in water, the pH may also otherwise reach the desired level.

It has also been found that the order of addition of the calcium and aluminium compounds is important when removing lignin according to the invention. In the method, it is preferable to add the calcium compound to alkaline water containing lignin, and allow the reaction to proceed for a period of time, followed by adjusting the pH to a neutral or slightly acidic value, and finally adding the aluminium compound. Thus, an ample precipitate is formed accompanied by the almost total disappearance of the yellowish colour of lignin. Sedimentation of the precipitate may be enhanced with a flocculant.

A parameter illustrating the lignin content is the UV absorbance at the wavelength of 280 nm. In best cases, the absorbance was reduced from a level of 3.7 to a level of 1.8.

Preferably an amount from 10 to 10,000 mg/l, more preferably from 50 to 1000 is mg/l of the calcium compound is added to the aqueous solution, calculated as calcium. Preferably an amount from 100 to 10,000 mg/l, more preferably from 300 to 1000 mg/l of the aluminium compound is added to the aqueous solution.

The calcium compound used in the invention is preferably selected from the group consisting of calcium oxide, calcium hydroxide, and inorganic calcium salts. More preferably, the calcium compound is calcium chloride or calcium sulphate, preferably calcium chloride.

The aluminium compound is preferably a polymeric aluminium hydroxide, or a polymeric aluminium hydroxide salt. The polymeric structure is obtained from a compound with hydroxylic groups building oxo bridges. Even more preferably, the aluminium compound is a polymeric aluminium hydroxide sulphate, polymeric aluminium hydroxide chloride, or a polymeric aluminium hydroxide diformate. Most preferably, the aluminium compound is aluminium hydroxide chloride having a ratio of OH to Al between 1:10 and 9:10.

In the following, the invention is illustrated by means of working and reference examples only meant for illustration.

EXAMPLES

Background

Waste waters from bleaching of straw contain dissolved lignin. The removal thereof with biological treatment methods is assumed to be difficult. In this work, precipitation of lignin using various chemicals e.g. polyvalent cations and organic polymers was studied.

Summary

In this work, the influence of Ca, Fe, and Al salts on turbidity, COD, and TOC of waste waters, as well as on its UV absorbance at a wavelenght of 280 nm, reflecting the lignin content thereof was studied.

Concurrent use of calcium and a polymeric aluminium salt (Kempac 18) was clearly shown as the most efficient combination. In Table below, calcium is added as an aqueous $CaCl_2$ solution.

|   | Ca mg/l | Kempac18 mg/l | pH | Turbidity NTU | UV abs 280 nm | COD mg/l | TOC mg/l |
|---|---|---|---|---|---|---|---|
| 0 | — | — | 10.2 | 66 | 3.673 | 2326 | 803 |
| 1 | 1000 | 1000 | 5.3 | 5 | 1.861 | 1276 | 375 |
| 2 | 100 | 1000 | 5.8 | 3 | 2.316 | 1374 | 393 |

$CaCl_2$ may be replaced with more sparingly soluble calcium oxide or gypsum. Precipitation result is slightly weaker.

Neither the precipitation, floc formation, nor sedimentation was made more efficient by the use of organic flocculants.

Results

The sample was designated as a mixture of raw and wash waters of WS, $21^{st}$ of Apr., 2004. Following properties were determined:

TABLE 1

| | Original water | | |
|---|---|---|---|
| | | Not centrifuged | Centrifuged |
| pH | | 10.2 | 10.2 |
| Turbidity | NTU | | 66.4 |
| COD | mg/l | 2170 | 2326 |
| TOC | mg/l | 797.3 | 802.9 |
| Cat.need | meq/l | 2.259 | 2.342 |
| UV abs | 280 nm | | 3.673 |
| SS | mg/l | 52 | |

Tables 2-5 show experimental results in small groups. In these experiments, calcium is added as $CaCl_2$ (the amount shown in the Table is calculated as Ca). Advantages of the concurrent use of calcium, and a polymeric aluminium salt are clearly shown by the results. Also the need for pH adjustment is substantial.

It is to be noted that the UV absorption is not reduced at all by only lowering the pH to a value of 3.

It was attempted to improve the efficiency of precipitation and flocculation by using polymers (Fennopols A321, K1384, K3450, and K506). The effects of these agents were very minimal, and often the addition of the polymer even impaired the flocculation. The polymer may, however, still work under practical conditions.

Table 6 presents the so-called confirmation test for a sample of 1 litre. Clarification of the precipitation was observed visually. Higher Ca doses clearly improved the sedimentation and compacted the precipitate.

In Table 7, the influence of different calcium salts on precipitation is compared. Reduction of the dose to a value below 1 g/l has an immediate effect on UV absorbance. Calcium oxide and gypsum are almost equivalent, gypsum being perhaps slightly more efficient. The reduction of the amount of Kempac to half immediately made both of the Ca salts inefficient.

Procedure

The testing was carried out with samples of 50-100 ml. The calcium salt was added first, mixed for about 2 minutes, or 30 minutes in cases the salt was solid. This was followed by the adjustment of the pH to 7, and the addition of the other coagulant. A mixing for a few minutes followed. Finally, the water was centrifuged and the particular properties were determined from the clarified sample.

TABLE 2

| Test no. | Coagulant | mg/l | pH | Turbidity NTU | UV abs 280 nm | COD mg/l | TOC mg/l | Note |
|---|---|---|---|---|---|---|---|---|
| 1 | Ca | 10 | 10.2 | 66 | 3.673 | 2326 | 803 | added as a solid |
| 2 | Ca | 100 | 10.1 | 52 | | | | |
| 3 | Ca | 1000 | 10.0 | 32 | | | | |
| 4 | Ca | 5000 | 9.7 | 13 | 3.645 | 1564 | 555 | |
|   | Ca | 5000 | 9.4 | 3 | | | | |
|   | Ca | 5000 | 9.3 | 2 | | | | |
| 5 | Fennoferri | 100 | 10.1 | 53 | | | | |
| 6 | Fennoferri | 500 | 9.8 | 63 | 4.000 | 2202 | 801 | |
| 7 | Fennoferri | 1000 | 8.8 | 77 | | | | |
| 8 | Kempac18 | 100 | 10.1 | 56 | | | | |
| 9 | Kempac18 | 500 | 9.7 | 64 | 3.831 | 2260 | 803 | |
| 10 | Kempac18 | 1000 | 8.3 | 83 | | | | |
| 11 | Alum | 10 | 10.2 | 54 | | | | |
| 12 | Alum | 100 | 10.1 | 59 | | | | |
| 13 | Alum | 500 | 9.2 | 59 | | | | |
| 14 | Alum | 1000 | 7.0 | 74 | 3.588 | 2232 | 788 | |

TABLE 3

| Test no. | Coagulant | mg/l | 1M $H_2SO_4$ µl/50 ml | pH | Turbidity NTU | UV abs 280 nm | COD mg/l | TOC mg/l |
|---|---|---|---|---|---|---|---|---|
| 15 | — | — | 675 | 3 | 146 | 3.854 | 2240 | 699 |
| 16 | Ca | 1000 | 225 | 6.8 | 1 | 3.591 | 1660 | 537 |
| 17 | Fennoferri | 500 | 150 | 7.0 | 63 | 3.700 | 2354 | 754 |
| 18 | Kempac18 | 500 | 125 | 6.9 | 60 | 3.529 | 2406 | 747 |
| 19 | Alum | 500 | 100 | 6.9 | 67 | 3.822 | 2378 | 897 |

TABLE 4

| Test no. | Coagulant | mg/l | Coagulant | mg/l | pH | Turbidity NTU | UV abs 280 nm | COD mg/l | TOC mg/l |
|---|---|---|---|---|---|---|---|---|---|
| 20 | Ca | 1000 | Kempac18 | 100 | 6.4 | 18 | 3.523 | 1590 | 530.2 |
| 21 | Ca | 1000 | Kempac18 | 500 | 5.4 | 3 | 1.795 | 1286 | 405.9 |
| 22 | Ca | 1000 | Kempac18 | 1000 | 5.3 | 2 | 1.605 | 1264 | 396.5 |
| 23 | Ca | 1000 | Fennoferi | 500 | 6.1 | 39 | 3.528 | 1492 | 473.3 |
| 24 | Ca | 1000 | PEO | 5 | 7.0 | 5 | 3.492 | | |
| 25 | Ca | 1000 | PEO | 10 | 7.0 | 5 | 3.531 | | |
| 30 | Ca | 100 | Kempac18 | 1000 | 5.8 | 1 | 1.919 | | |
| 31 | Ca | 500 | Kempac18 | 1000 | 5.7 | 3 | 2.169 | | |
| 34 | | | FF240 | 400 | 7.2 | 335 | 3.800 | | |
| 35 | | | FF240 | 800 | 7.4 | 7 | 3.370 | | |
| 36 | | | ORC2003 | 400 | 6.8 | 124 | 4.000 | | |
| 37 | | | Orc2003 | 800 | 6.4 | 155 | 3.790 | | |

TABLE 5

| Test no. | Coagulant | mg/l | Coagulant | mg/l | pH | Turbidity NTU | UV abs 280 nm |
|---|---|---|---|---|---|---|---|
| 26 | Ca | 100 | Kempac18 | 1000 | 8.4 | 63 | 3.596 |
| 27 | Ca | 500 | Kempac18 | 1000 | 7.8 | 18 | 3.654 |
| 28 | Ca | 1000 | Kempac18 | 1000 | 8.4 | 6 | 3.480 |
| 29 | Ca | 1000 | Kempac18 | 5000 | 9.3 | 5 | 3.586 |
| 32 | FF240 | 400 | | | | 272 | 3.772 |
| 33 | FF240 | 800 | | | | 373 | 4.000 |

Without pH Adjustment

TABLE 6

| Ca mg/l | Kempac18 mg/l | pH | Turbidity NTU | UV abs 280 nm | COD mg/l | TOC mg/l |
|---|---|---|---|---|---|---|
| 0 | — | 10.2 | 66 | 3.673 | 2326 | 803 |
| 1000 | 1000 | 5.3 | 5 | 1.861 | 1276 | 375 |
| 100 | 1000 | 5.8 | 3 | 2.316 | 1374 | 393 |

Rapid mixing at 400 rpm for 10 sec during which Ca was added, slow mixing for 5 min.

pH was adjusted using magnetic stirring

Rapid mixing at 400 rpm for 10 sec during which Kempac was added, slow mixing for 5 min.

Sedimentation over night

In test 1, proportion of precipitate of about 100 ml/500 ml

In test 2, proportion of precipitate of about 200 ml/500 ml

In test 3, sedimentation of the precipitate was slower, the precipitate being lighter and partly floating.

TABLE 7

Forms of addition of calcium

| Test no. | Coagulant | | Coagulant | | 1M $H_2SO_4$ µl/100 ml | pH | Turbidity NTU | UV abs 280 nm | COD mg/l | TOC mg/l |
|---|---|---|---|---|---|---|---|---|---|---|
| | | mg/l | | mg/l | | | | | | |
| 0 | — | — | — | — | — | 10.2 | 66 | 3.673 | 2326 | 803 |
| 1 | CaO | Ca | 1000 | Kempac18 | 1000 | 560 | 5.9 | 1 | 1.978 | 1372 | 391 |
| 2 | $CaSO_4$ | Ca | 1000 | Kempac18 | 1000 | 400 | 5.8 | 1 | 1.928 | 1356 | 391 |
| 3 | $Ca(OH)_2$ | Ca | 1000 | Kempac18 | 1000 | 600 | 5.9 | 2 | 2.167 | 1406 | 410 |
| 5 | CaO | Ca | | Kempac18 | 1000 | | 6.2 | 33 | 3.016 | 1552 | 472 |
| 4 | CaO | Ca | | Kempac18 | 1000 | 500 | 6.8 | 7 | 2.469 | 1478 | 446 |
| 7 | $CaSO_4$ | Ca | | Kempac18 | 1000 | | 6.1 | 10 | 2.274 | 1434 | 426 |
| 6 | $CaSO_4$ | Ca | | Kempac18 | 1000 | | 6.3 | 7 | 2.387 | 1420 | 432 |
| 8 | CaO | Ca | | Kempac18 | 500 | | 6.5 | 43 | 3.595 | | |
| 9 | CaO | Ca | | Kempac18 | 100 | | 6.9 | 64 | 3.622 | | |
| 10 | $CaSO_4$ | Ca | | Kempac18 | 500 | | 6.3 | 24 | 3.606 | | |
| 11 | $CaSO_4$ | Ca | | Kempac18 | 100 | | 6.7 | 22 | 3.688 | | |

The invention claimed is:

1. Method for removing lignin from an aqueous solution, comprising:

adding a calcium compound and an aluminium compound to the aqueous solution, characterized in that said aqueous solution is basic waste water from the bleaching of chemical pulp, characterized in that said calcium compound and said aqueous solution are combined to give a solution having a pH from 4.5 to 7, followed by the addition of said aluminium compound to this solution to precipitate lignin, characterized in that said aluminium compound is a polymeric aluminium hydroxide, or a polymeric aluminium hydroxide salt; and removing precipitated lignin from said aqueous solution.

2. Method of claim 1, characterized in that the pH of the solution is adjusted to a value from 5 to 6.

3. Method of claim 1, characterized in that an amount from 10 to 10,000 mg/l of said calcium compound is added to said aqueous solution, calculated as calcium.

4. Method of claim 3, characterized in that an amount from 50 to 1000 mg/l of said calcium compound is added to said aqueous solution, calculated as calcium.

5. Method of claim 1, characterized in that an amount from 100 to 10,000 mg/l of said aluminium compound is added to said aqueous solution.

6. Method of claim 5, characterized in that an amount from 300 to 1000 mg/l of said aluminium compound is added to said aqueous solution.

7. Method of claim 6, characterized in that said calcium compound is calcium chloride, or calcium sulphate.

8. Method of claim 1, characterized in that said calcium compound selected from the group consisting of calcium oxide, calcium hydroxide, and inorganic calcium salts.

9. Method of claim 1, characterized in that said aluminium compound is a polymeric aluminium hydroxide sulphate, polymeric aluminium hydroxide chloride, or a polymeric aluminium hydroxide formate.

10. Method of claim 9, characterized in that said aluminium compound is polymeric aluminium hydroxide chloride having a ratio of OH to Al between 1:10 and 9:10.

* * * * *